May 26, 1942. O. E. DOW 2,284,379

ULTRA HIGH FREQUENCY VOLTMETER

Filed Dec. 29, 1939

INVENTOR.
ORVILLE E. DOW

BY *H. S. Suver*

ATTORNEY.

Patented May 26, 1942

2,284,379

UNITED STATES PATENT OFFICE 2,284,379

ULTRA HIGH FREQUENCY VOLTMETER

Orville E. Dow, Rocky Point, N. Y., assignor to Radio Corporation of America, a corporation of Delaware Application December 29, 1939, Serial No. 311,507

14 Claims. (Cl. 171—95)

This invention relates to improvements in voltmeters and voltage standards for ultra high frequencies and, more particularly, to such instruments for frequencies greater than 300 megacycles.

The present practice is to use thermionic diodes or thermo-couples in conjunction with the direct current meters and multiplying resistors to measure frequency voltages. The thermionic diode in conjunction with the direct current instrument is a very valuable instrument for most alternating current measurements but is subject to errors at frequencies above 300 megacycles due to the transit time of electrons within the diode and also errors due to the inductance of the electrode leads. Furthermore, the thermionic diode also requires a power supply for the filaments. Thermo-couple meters, in spite of the recent improvements, are still subject to considerable error at ultra high frequencies unless great care is exercised in avoiding effects of stray capacities and fields.

An object, therefore, of the present invention is to provide an instrument which is free from the above mentioned sources of error.

Another object of the present invention is to provide an ultra high frequency voltmeter which is not effected by stray capacities across the multiplying impedances which must be used.

Still another object of the present invention is to provide an ultra high frequency voltmeter which is conveniently used, which may be readily calibrated and which disturbs the circuit to which it is connected to a negligible extent.

The foregoing objects are attained by the provision, in accordance with the present invention, of a thermo-couple with a novel arrangement of uncoupling the heater leads from the thermo-couple leads so that the latter are completely shielded from radio frequency fields. A novel form of multiplier is also provided between the source and the thermo-couple heater element. Furthermore, the present invention includes an arrangement whereby the effect of stray capacities across the multiplying impedance is reduced.

Figure 1:
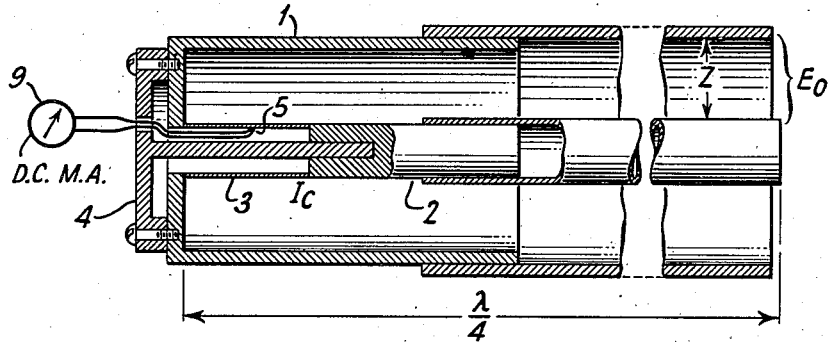
Figure 2:
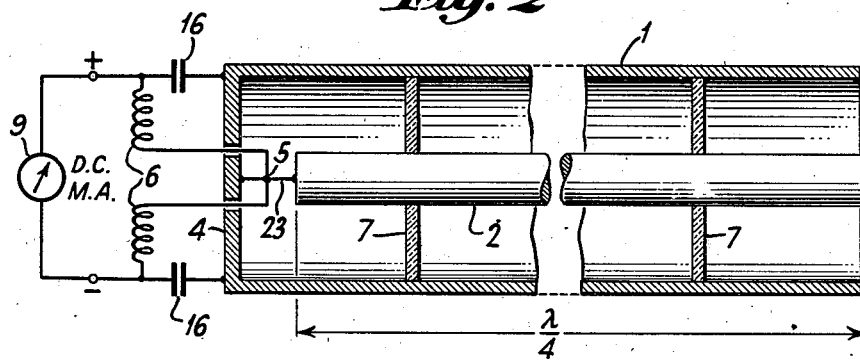
Figure 3:
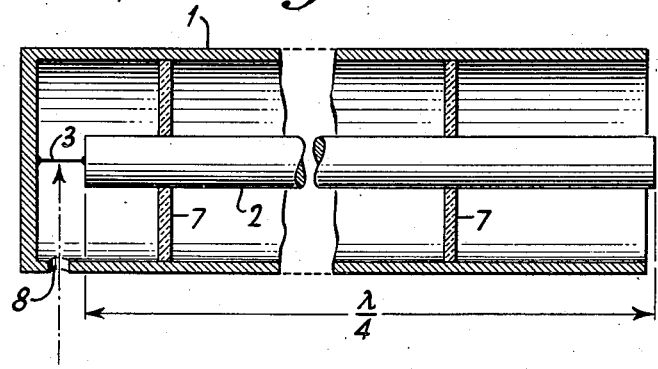

Further objects and features of the present invention will become apparent from the following detailed description, which is accompanied by a drawing in which Figure 1 shows one modification of the invention, Figure 2 shows a modification which is useable with lower voltage ranges and Figure 3 shows still a further modification of the invention.

In Figure 1 I have shown a section of a concentric cable transmission line composed of an outer shell 1 and an inner conductor 2. The length of this section of line is adjustable, by means of the telescopic joints in the shell and inner conductor, to be equal to a quarter of the length of the wave which it is desired to measure. A characteristic of a quarter wave section of transmission line, closed at one end, is that the voltage applied at the open end of the line is transformed to current at the closed end of the line, that is, it acts as an impedance inverting network. The value of the current at the closed end of the line is equal to the voltage at the open end divided by the characteristic impedance of the transmission line. It should be noted that shell 1 and conductor 2 are effectively in series across the applied voltage. Since their total length is a half wave the device does not load the circuit across which it is connected. At the inner end of the transmission line the inner conductor 2 is connected to the outer conductor 1 by means of a very thin conducting cylinder 3 which preferably has the same diameter as inner conductor 2. This thin cylinder 3 forms the heater for the thermo-couple unit which will later be described in more detail. The heater 3 must be securely connected to inner conductor 2 and the end plate of outer shell 1 so that a full contact is made. The walls of the heater element 3 must be thin enough that its direct current resistance is equal to the resistance at the frequency for which the meter is designed. The cylinder must be short enough to have a uniform distribution of current over its length. Furthermore, the wall thickness must be uniform to prevent spotty heating.

Platinum is suitable material of which to make the heater element 3. To the interior of the heater element 3 is connected the thermo-couple junction 5 of conventional construction. A direct current meter 9 is connected to the thermo-couple junction 5 by suitable leads. It will be noted by an inspection of Figure 1 that the thermo-couple junction 5 and the leads connected thereto are located inside the tube 3 so that they are completely shielded from the radio frequency field which is necessarily confined to the space between the inner conductor 2 and the outer shell 1. The inner conductor 2 is mechanically supported by bridge piece 4 which may be made of either insulating or conducting material, as desired. The parts 1 and 2 of the quarter wave transformation line each are shown as being made of telescopic sections so that the lengths thereof may be adjusted to an odd number of quarter wavelengths over a wide range of frequencies.

In operation, the voltmeter as shown in Figure 1 may be calibrated by noting the reading of the direct current meter 9 when a known low frequency or direct current flows through the transformation line from the source applied at the open end of the line. When an unknown voltage of a wavelength equal to four times the length of the inner conductor 2 is applied at the open end of the transformation line the resultant current at the voltage nodal point is determined from the reading of previously calibrated meter 9. The unknown voltage at the open end of the line is found by multiplying this current by the characteristic impedance of the transmission line. If the unknown voltage is designated by the quantity $E_0$, the impedance of the transformation line by the quantity $Z$ and the current at the closed end of the line by the quantity $I_c$, the voltage $E_0$ is then equal to $ZI_c$.

In practice, it will be found convenient to so choose the range of the direct current meter 9 and the characteristic impedance of the transformation line so that the meter may be calibrated directly in voltages appearing at the open end of the line. The lowest voltage which may be read by this meter as shown in Figure 1 is determined by the minimum thickness to which it is possible to roll the material of which heater 3 is composed. When it is necessary to measure still lower voltages the arrangement shown in Figure 2 may be used wherein the transformation line is constructed in the same way as described with reference to Figure 1. However, in this modification the heater 23 consists of a short length of very fine wire joining the inner end of conductor 2 and the outer shell 1. In this modification since it is not possible to make the inner conductor 2 self-supporting suitable insulators 7 are interposed between shell 1 and conductor 2 at the desired intervals along the length of the transmission line. The thermo-couple junction 5 is connected to the heater wire 23 in any suitable fashion and the leads therefrom are brought out through the end wall of the transformation line to direct current meter 9. In this modification the junction and thermo-couple leads are exposed to radio frequency fields and it is, therefore, necessary to filter the direct current leads by means of inductances 6 and condensers 16. As in the previously described modification, the length of heater 23 must be short enough to insure uniform distribution of current and the diameter must in this modification be small enough to avoid errors due to "skin effect." The diameter of the inner conductor 2 must be kept small in order to reduce stray capacity across the heater element 3 between the end of conductor 2 and the end wall 4.

In Figure 3 I have shown a further modification of the invention which may also be utilized in establishing a voltage standard. The operation is similar to the operation of the modification shown in Figure 2, with the exception that the current at the voltage nodal point is determined visually by the temperature of the wire instead of using a thermo-couple element. The current through the wire 33 required to raise its temperature until it just barely glows may be definitely determined. The heater wire 33 is well shielded by the outer shell 1 thus avoiding any errors due to air currents cooling the wire. An aperture 8 is provided in the outer shell 1 as a means for observing the temperature of wire 33. To operate this device as a voltage standard the value of current required to make the wire glow to a predetermined amount may be determined at low frequencies or with direct current. The ultra high frequency generator is then connected to the open end of the line and the voltage raised until the wire again shows the same color. The voltage at the input of the line is then equal to the current in wire 33 multiplied by the characteristic impedance of the line. The standard voltage may be varied by utilizing different diameters and resistivities of wire 33 and different values of characteristic impedance of the transformation line. Furthermore, within certain limits the temperature of wire 33 may be determined by an optical pyrometer. The readings of the pyrometer may be directly calibrated in voltages in the open end of transformation line 1, 2. If desired, the temperature of wire 33 may be determined by a thermometer, which may then be calibrated in terms of voltage at the open end of line 1, 2. The modification shown in Figure 3 is not useable for such large values of current as the modification shown in Figure 1 since the maximum possible useable diameter of the wire 33 is limited by skin effect of the high frequency current causing errors as the diameter is increased.

While I have particularly shown and described an embodiment of the present invention, it is to be clearly understood that my invention is not limited thereto but that modifications may be made within the scope of this invention.

I claim:

1. In combination, a concentric line section having an inner conductor and an outer shell, said outer shell being closed at one end and said section being adapted to have radio frequency voltage applied to the open end thereof, the length of said line section being equal to a quarter of the wavelength of said applied voltage, a heater element connected between said inner conductor and the closed end of said outer shell and means for determining the relative temperature of said heater element.

2. In combination, a concentric line section having an inner conductor and an outer shell, said outer shell being closed at one end and said section being adapted to have radio frequency voltages applied to the open end thereof, said inner conductor and outer shell being telescopic whereby the length of said line section is adjustable to a length equal to a quarter of the wavelength of the applied voltage, a heater element connected between said inner conductor and the closed end of said outer shell and means for determining the relative temperature of said heater element.

3. In combination, a concentric line section having an inner conductor and an outer shell, said outer shell being closed at one end and said section being adapted to have radio frequency voltages applied to the open end thereof, the length of said line being equal to a quarter of the wavelength of the applied voltage, a heater element connected between said inner conductor and the closed end of said outer shell, a thermo-couple in contact with said heater element and means connected to said thermo-couple for measuring the current flowing through said heater element.

4. In combination, a concentric line section having an inner conductor and an outer shell, said outer shell being closed at one end and said section being adapted to have radio frequency voltages applied to the open end thereof, the length of said line being equal to a quarter of the wavelength of the applied voltage, a heater element connected between said inner conductor and the closed end of said outer shell, a thermo-couple in contact with said heater element, means connected to said thermo-couple for measuring the current flowing through said heater element, and means for preventing radio frequency currents from affecting said measuring means.

5. In combination, a concentric line section having an inner conductor and an outer shell, said outer shell being closed at one end and said section being adapted to have radio frequency voltages applied to the open end thereof, the length of said line being equal to a quarter of the wavelength of the applied voltage, a heater element connected between said inner conductor and the closed end of said outer shell, a thermo-couple in contact with said heater, a direct current meter, connections from said direct current meter to said thermo-couple, said connections including series inductances and parallel capacities whereby radio frequency currents are prevented from affecting said direct current meter.

6. In combination, a concentric line section having an inner conductor and an outer shell, said outer shell being closed at one end and said section being adapted to have radio frequency voltages applied to the open end thereof, the length of said line section being equal to a quarter of the wavelength of the applied voltage, a thin conductive tube connected between said inner conductor and said closed end of the outer shell and means for determining the relative temperature of said thin conductive tube.

7. In combination, a concentric line section having an inner conductor and an outer shell, said outer shell being closed at one end and said section being adapted to have radio frequency voltages applied to the open end thereof, the length of said line section being equal to a quarter of the wavelength of the applied voltage, a thin conductive tube connected between said inner conductor and the closed end of said outer shell, a thermo-couple within said tube and a direct current meter connected to said thermo-couple.

8. In combination, a concentric line section having an inner conductor and an outer shell, said outer shell being closed at one end and said section being adapted to have radio frequency voltages applied to the open end thereof, the length of said line section being equal to a quarter of the wavelength of the applied voltage, a thin conductive tube having a diameter equal to the diameter of said inner conductor and connected between said inner conductor and the closed end of said outer shell, a thermo-couple within said tube and in contact with its inner surface and a direct current meter connected to said thermo-couple.

9. In combination, a concentric line section having an inner conductor and an outer shell, said outer shell being closed at one end and said section being adapted to have radio frequency voltages applied to the open end thereof, the length of said line section being equal to a quarter of the wavelength of the applied voltage, a thin conductive tube having a diameter equal to the diameter of said inner conductor and connected between said inner conductor and the closed end of said outer shell, a thermo-couple within said tube and in contact with its inner surface and a direct current meter connected to said thermo-couple by leads within said tube and passing through an aperture in said closed end.

10. In combination, a transformation line section comprising a pair of parallel conductors, said conductors being connected together at one end and said section being adapted to have radio frequency voltages applied to the open end thereof, the length of said line section being equal to a quarter of the wavelength of said radio frequency voltages, a heater element forming the connection between said pair of conductors and means for determining the relative temperature of said heater element.

11. In combination, a transformation line section comprising a pair of parallel conductors, said conductors being connected together at one end and said section being adapted to have radio frequency voltages applied to the open end thereof, the length of said line section being equal to a quarter of the wavelength of said radio frequency voltages, a heater element forming the connection between said pair of conductors, a thermo-couple in contact with said heater element and means connected to said thermo-couple for measuring the current flowing through said heater element.

12. In combination, a transformation line section comprising a pair of parallel conductors, said conductors being connected together at one end and said section being adapted to have radio frequency voltages applied to the open end thereof, the length of said line section being equal to a quarter of the wavelength of said radio frequency voltages, a heater element forming the connection between said pair of conductors, a thermo-couple in contact with said heater element, means connected to said thermo-couple for measuring the current flowing through said heater element and means for preventing radio frequency currents from affecting said measuring means.

13. A high frequency voltmeter comprising an impedance inverting device having an input and an output, and current responsive means connected to said output, said device being adapted to transform a voltage applied to said input to a current through said current responsive means having an amplitude proportionate to said voltage, said current responsive means being adapted to indicate the amplitude of said current.

14. A high frequency voltmeter comprising an impedance inverting device having an input and an output, and current responsive means connected to said output, said device being adapted to transform a voltage applied to said input to a current through said current responsive means having an amplitude proportionate to said voltage, said current responsive means comprising a thermo-couple having input terminals connected to the output of said impedance inverting device and output terminals connected to a direct current meter.

ORVILLE E. DOW.